(12) United States Patent
Graf et al.

(10) Patent No.: US 10,433,394 B2
(45) Date of Patent: Oct. 1, 2019

(54) SENSORY NETWORKING DEVICE AND METHOD OF USE

(71) Applicant: THE REGENTS OF THE UNIVERSITY OF MICHIGAN, Ann Arbor, MI (US)

(72) Inventors: Roland Graf, Ann Arbor, MI (US); Prabal Dutta, Ann Arbor, MI (US); Brad Campbell, Ann Arbor, MI (US); Surat Kwanmuang, Bangkok (TH)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/301,069

(22) PCT Filed: May 12, 2017

(86) PCT No.: PCT/US2017/032427
§ 371 (c)(1),
(2) Date: Nov. 13, 2018

(87) PCT Pub. No.: WO2017/197275
PCT Pub. Date: Nov. 16, 2017

(65) Prior Publication Data
US 2019/0191524 A1 Jun. 20, 2019

Related U.S. Application Data

(60) Provisional application No. 62/335,757, filed on May 13, 2016.

(51) Int. Cl.
*H05B 33/08* (2006.01)
*G08B 5/36* (2006.01)
(Continued)

(52) U.S. Cl.
CPC .......... *H05B 33/0872* (2013.01); *A43C 9/00* (2013.01); *G02B 6/0006* (2013.01); *G08B 5/36* (2013.01); *H05B 37/0272* (2013.01)

(58) Field of Classification Search
CPC H05B 33/08; H05B 33/0842; H05B 33/0872; H05B 37/02; H05B 37/0227;
(Continued)

(56) References Cited

U.S. PATENT DOCUMENTS 7,057,153 B2   6/2006  Linge et al.
7,207,688 B2   4/2007  Yuen et al.
(Continued)

FOREIGN PATENT DOCUMENTS

EP   2128833 A1   12/2009

OTHER PUBLICATIONS

International Search Report and Written Opinion of the International Searching Authority issued in PCT/US2017/032427, dated Aug. 30, 2017.

*Primary Examiner* — Jimmy T Vu
(74) *Attorney, Agent, or Firm* — Harness, Dickey & Pierce, P.L.C.

(57) ABSTRACT

A sensory networking device is provided that enables a sensory effect to be implemented across a sensory network. The sensory networking device includes a processor, a sensory output unit, a motion sensor and a transceiver that permits the device to detect a trigger movement and transmit a trigger signal that causes a sensory effect to be implemented on neighboring sensory networking devices and to re-transmit the trigger signal in order to propagate a sensory effect across a sensory network.

20 Claims, 6 Drawing Sheets

(51) Int. Cl.
*A43C 9/00* (2006.01)
*F21V 8/00* (2006.01)
*H05B 37/02* (2006.01)

(58) Field of Classification Search
CPC .... H05B 37/0272; A43C 9/00; G02B 6/0006; G08B 5/36
See application file for complete search history.

(56) References Cited

U.S. PATENT DOCUMENTS

| | | |
|---|---|---|
| 8,087,801 B2 | 1/2012 | Tseng |
| 8,103,802 B2 * | 1/2012 | Lay .......................... A43B 3/00 36/1 |
| 8,217,789 B2 | 7/2012 | Script |
| 2004/0227064 A1 | 11/2004 | Linge et al. |
| 2007/0041193 A1 | 2/2007 | Wong et al. |
| 2009/0009990 A1 | 1/2009 | Tseng |
| 2010/0097205 A1 | 4/2010 | Script |

* cited by examiner

SENSORY NETWORKING DEVICE AND METHOD OF USE

CROSS-REFERENCE TO RELATED APPLICATIONS

This application is the U.S. National Phase Application under 35 U.S.C. 371 of International Application No. PCT/US2017/032427 filed on May 12, 2017, which claims the benefit of and priority to U.S. Provisional Patent Application No. 62/335,757 filed on May 13, 2016. The entire disclosures of the above applications are herein by reference.

FIELD

The present disclosure relates to networking devices and related methods for propagating a sensory effect.

BACKGROUND

This section provides background information related to the present disclosure which is not necessarily prior art. This section also provides a general summary of the disclosure, and is not a comprehensive disclosure of its full scope or all of its features.

Many products and devices exist in the marketplace that produce a sensory effect. A sensory effect may be any outcome that is detectable by one or more of the human senses. For example, a sensory effect may include a display of light, a sound, or a tactile response. One category of products and devices that produce a visual sensory effect is a wearable light-emitting product such as a light-emitting shoelace or a light-emitting bracelet or necklace. Many other products that produce a visual sensory effect exist as well such as toys, signs, decorative home lighting and the like.

More and more objects and devices, such as aforementioned objects and devices that produce sensory effects, are becoming tied together with wireless network technology. Still further, consumers desire to communicate and connect with others regarding various common interests and activities. Yet none of the many visual sensory effect (i.e., light-up) toys, wearables or decorative lighting products on the market build on the benefits of wireless network technology to interact and/or operate as a system without wire or cable connection.

Further, many existing products or systems that permit interaction require conventional control systems to communicate, if at all, to neighboring devices using user interfaces displayed on smart phones or other computing devices. Few of these devices use natural interaction methods, body movements such as jumping, stomping, hand clapping, gestures, or dance movements or bio-feedback as a trigger for light signals or other sensory effects to be communicated to surrounding devices or other users. Furthermore, there has been no technology developed yet for a connected sensory effect product for large crowds on the street where crowd interactions happen, unfiltered, spontaneous and in real time.

Another limitation of existing networking devices and methods is that communication and networking often requires a blanket communications network such as a cellular network to provide the infrastructure to disseminate communications across connected devices. There exists a need, therefore, for sensory effect devices that provide networking and communication capabilities wirelessly without the need for connection to a third-party, or blanket communications network.

SUMMARY

In one example of the present disclosure a method of propagating a sensory effect includes implementing a sensory effect on a sensory networking device in response to a sensory effect input, detecting a trigger movement of the sensory networking device and transmitting a trigger signal to one or more neighboring sensory networking devices. Such a trigger signal can be configured to cause the sensory effect to be implemented on one or more neighboring sensory networking devices and further configured to cause the trigger signal to be re-transmitted by the one or more neighboring sensory networking devices.

In another example, the sensory networking device is a light-emitting shoelace device.

In another example, the sensory effect is a display of light.

In still another example, the method of propagating a sensory effect further includes receiving trigger movement data from a motion sensor of the sensory networking device and analyzing the trigger movement data by comparing the trigger movement data to one or more predetermined trigger movement characteristics.

In another example, the trigger signal includes sensory effect data, sensory networking device identification data and synchronizing data.

In another example, the trigger movement of the previously described method is the stomp or kick of a foot on which the sensory networking device is attached.

In another example, the trigger signal transmitted by the sensory networking device is repeated two or more times or until the sensory effect is implemented on one or more neighboring sensory networking devices.

In another example, the sensory networking device includes a processor, a sensory output unit connected to the processor and configured to emit a sensory effect, a motion sensor connected to the processor and configured to detect movement and generate trigger movement data in response thereto, a transceiver connected to the processor and configured to transmit a trigger signal and non-transitory memory connected to the processor and having instructions stored thereon that when executed by the processor cause the processor to receive trigger movement data, analyze the trigger movement data and transmit the trigger signal to one or more neighboring sensory networking devices when the trigger movement data meets one or more predetermined characteristics. The foregoing trigger signal is configured to cause the sensory effect to be implemented on one or more neighboring sensory networking devices and to cause the trigger signal to be re-transmitted by the one or more neighboring sensory networking devices.

In another example, the re-transmission of the trigger signal allows the trigger signal to be received by neighboring sensory networking devices located at a distance greater than a range of the transceiver of the sensory networking device that originally transmitted the trigger signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some examples, well-known processes, well-known device structures, and well-known technologies are not described in detail.

Figure 1:
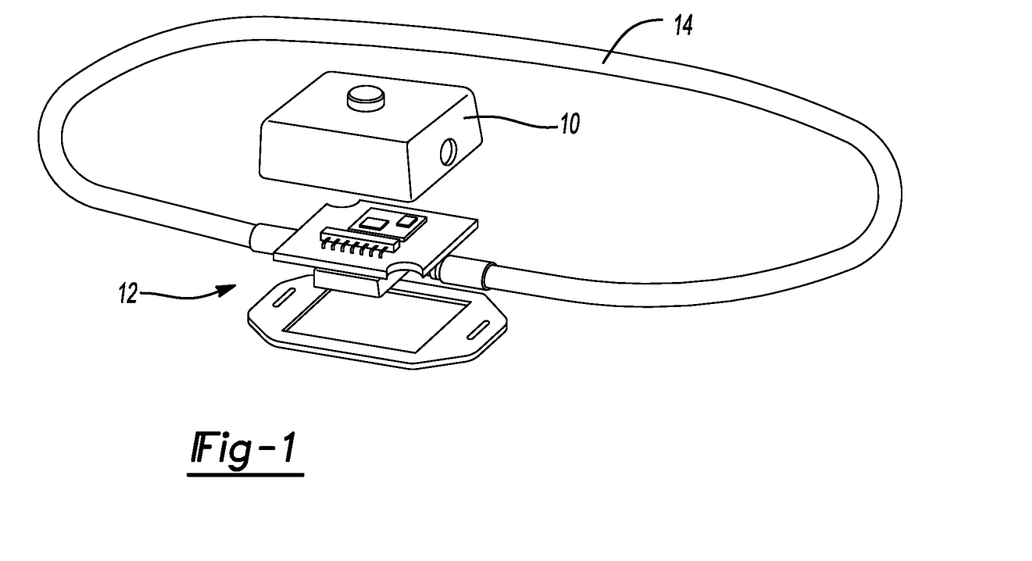
FIG. 1 illustrates an example sensory networking device of present disclosure.
Figure 2:
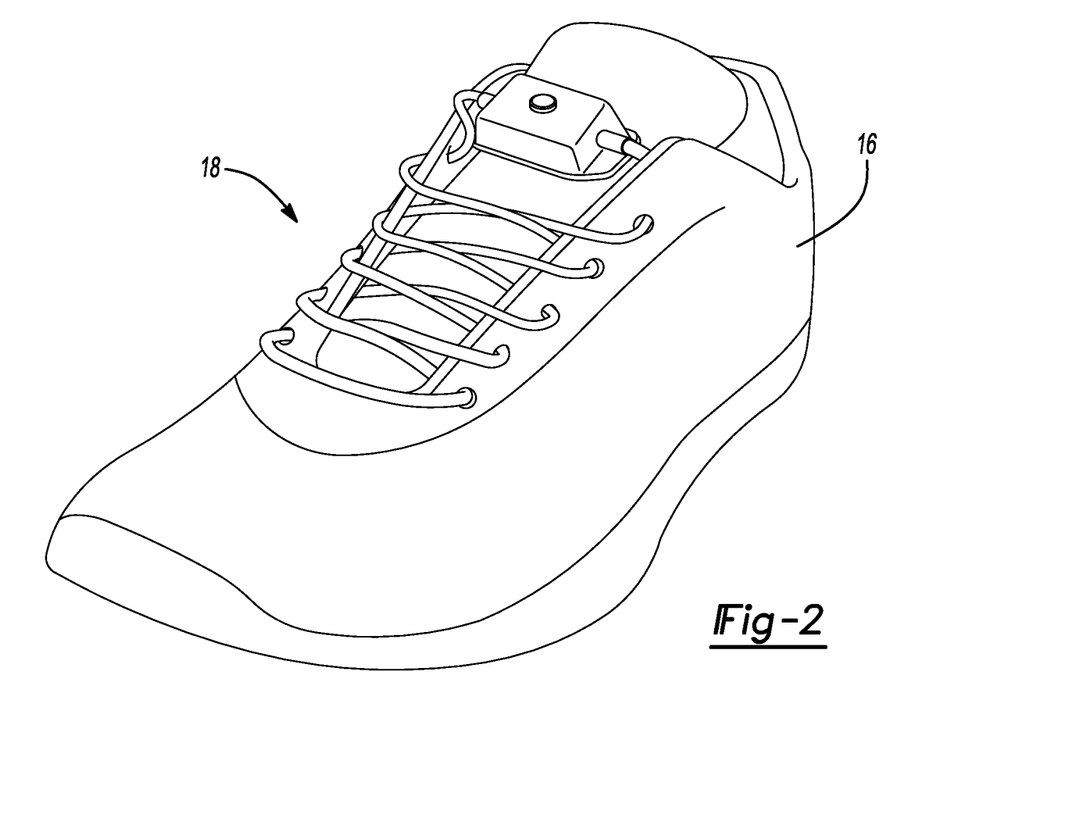
FIG. 2 illustrates an example light-emitting shoelace device of the present disclosure.
Figure 3:
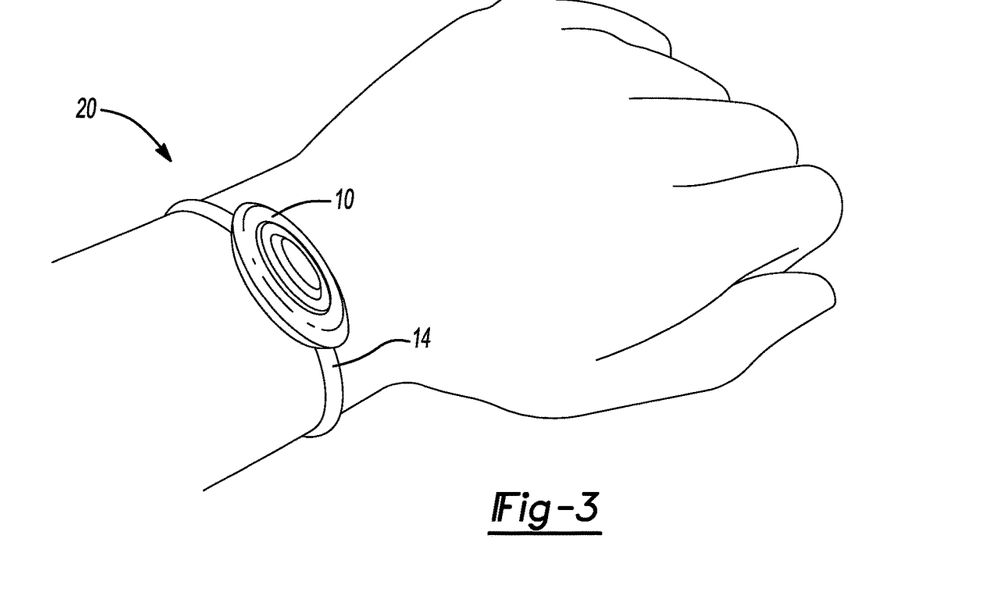
FIG. 3 illustrates an example light-emitting bracelet device of the present disclosure.

An example sensory networking device 12 of the present disclosure is shown in FIG. 1. As previously discussed, a sensory networking device can be any device that produces a result that is capable of being detected by one or more of the human senses. Two examples of sensory networking device 12 are shown in FIGS. 2 and 3. As can be seen, FIG. 2 shows an example in which sensory networking device 12 is a light-emitting shoelace device 18 worn on a shoe 16. In FIG. 3, sensory networking device 12 is a light-emitting bracelet device 20. The structure and related methods of use described in the present disclosure can also be employed in various other examples such as headphones, eyewear, hats, toys, signs, decorative lighting and the like.

Figure 4:
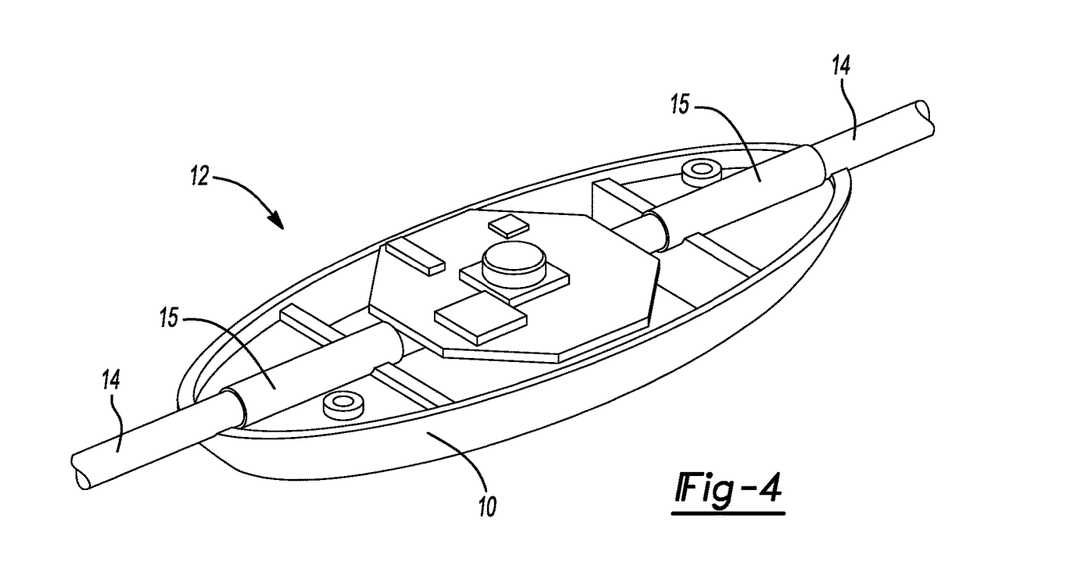
FIG. 4 illustrates a second example of a portion of a sensory networking device of the present disclosure.

As shown in FIG. 1, sensory networking device 12 can include housing 10 and flexible light fiber 14. Housing 10 is a compartment in which the electronic components of sensory networking device are contained and protected from damage or exposure to the elements. Housing 10 can be constructed of various shapes and sizes so as to accommodate the electronic components as will be hereinafter described. In the example shown in FIG. 1, housing is constructed of plastic and molded into a rectangular shape. FIG. 4 shows a second example configuration of housing 10 that is molded into an oval or elliptical shape. Still other shapes can also be used.

As shown in FIG. 4, housing 10 can also include one or more connection points 15 to which flexible light fiber 14 is attached. Flexible light fiber 14 can be constructed of any suitable fiber optic cabling to transmit and display the light emitted by an LED module that may be included in sensory networking device 12. Flexible light fiber 14 can also be constructed of electroluminescent (EL) wire or a micro LED string light. As can be seen in FIGS. 2 and 3, flexible light fiber 14 can be made of a suitable length so as to be suitable for a shoelace, bracelet or other wearable light-emitting product.

Referring back to FIG. 4, sensory networking device 12, in this example, includes a printed circuit board (PCB) that includes the various electronic components that enable the sensory effects and interactions with the user and neighboring sensory networking devices as will be explained.

Figure 5:
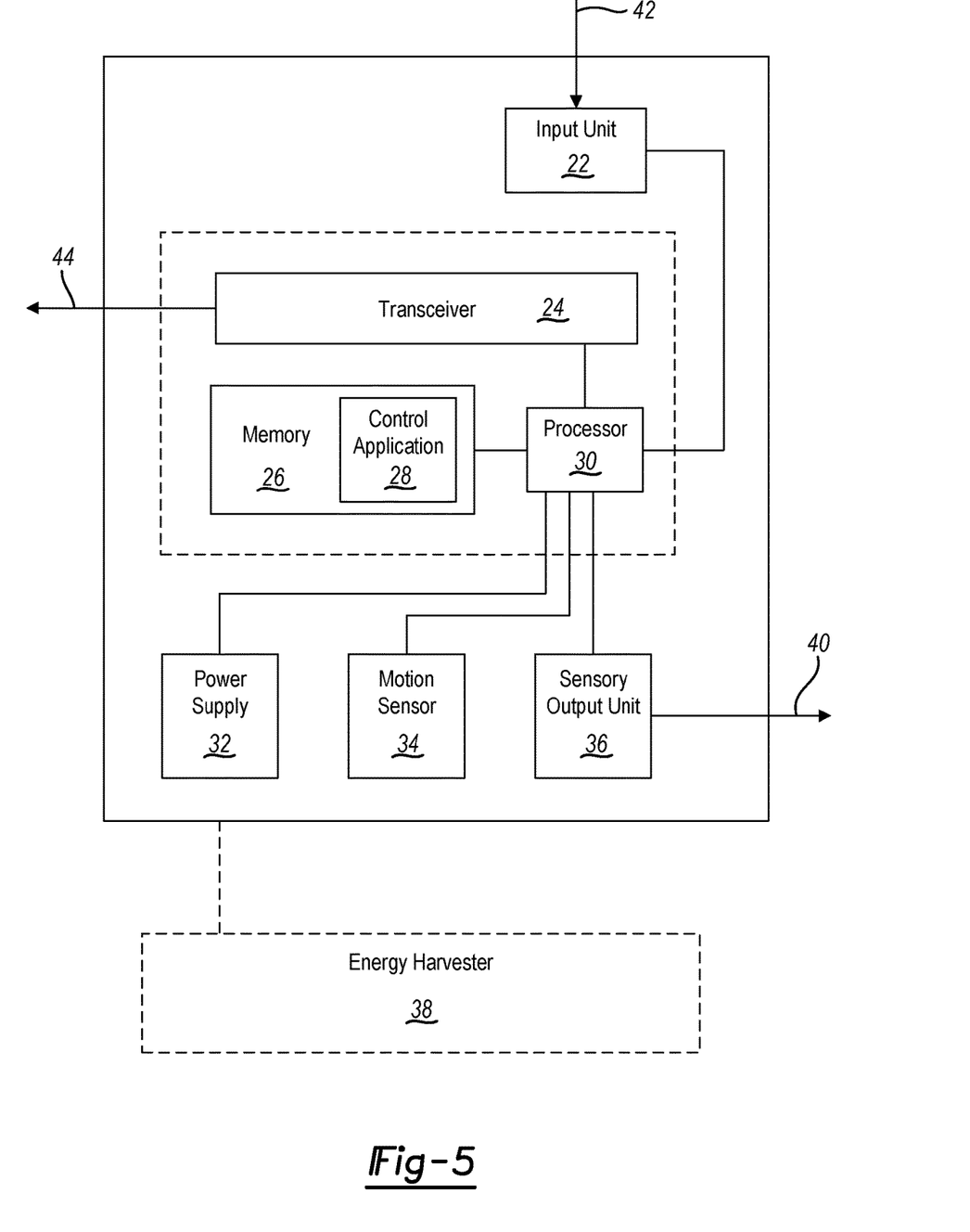
FIG. 5 is a block diagram of an example sensory networking device of the present disclosure.

FIG. 5 shows a block diagram of one example of sensory networking device 12. As can be seen, the example sensory networking device 12 includes input unit 22, transceiver 24, memory 26, processor 30, power supply 32, motion sensor 34 and sensory output unit 36. Input unit 22 is the module of sensory networking device 12 that enables a user to interface with sensory networking device 12. Input unit 22 can be a switch that interfaces with a push button on housing 10 that can be depressed to affect certain outcomes of sensory networking device 12. In a preferred embodiment, a switch such as a tactile 0.05 A, 15V switch produced by E-Switch can be used. Other suitable input units can also be used such as touchscreens, microphones, keypads and the like. Sensory networking device 12 also includes power supply 32. Power supply 32 can be any suitable power supply and is preferably long-lasting and small in size to enable sensory networking device 12 to be portable while having a suitable life. In the example embodiment, power supply 32 can be coin battery.

Sensory networking device 12 may also include transceiver 24, memory 26 and processor 30. These components can be, as well as the other described components, integrated into a single physical element in sensory networking device 12 despite being shown as separate elements in block diagram FIG. 5. In one example of sensory networking device 12, transceiver 24, memory 26 and processor 30 are integrated into a single physical unit. In a preferred example, a multiprotocol Bluetooth low energy module can be used such as model no. NRF51822-QFAC-R made by Nordic Semiconductor. Other suitable components can also be used. Transceiver 24 is the module of sensory networking device 12 that is enabled to transmit and receive signals from other sensory networking devices 12. As previously described, transceiver 24 can be Bluetooth-enabled to provide this functionality. Other communication methods could also be used such as Wi-Fi, infrared, ultra-wideband and Zigbee. Transceiver 24 can also be configured to provide additional functionality to sensory networking device 12. Transceiver 24 could also be used to send and/or receive communications from other similarly-enabled devices (in one example, other Bluetooth-enabled devices). In such examples, a mobile phone or other computing device could be used to communicate with and provide the transfer of information or provide additional control features for interaction with sensory device 12. While not shown in FIG. 5, sensory networking device 12 may also include other components to enhance its functionality such as an antenna. An antenna may be desired to provide additional range to that provided by transceiver 24.

Transceiver 24, input unit 22 and power supply 32 are all connected to processor 30. Additionally connected to processor 30 is memory 26. Memory 26 can be any suitable non-transitory memory that can store control application 28. Control application 28 is, in one example, executable instructions that, when executed by the processor, enable the functionality of sensory networking device 12 as will be described. Control application 28 may include one or more sub-applications that provide instructions or receive data to or from the various elements of sensory networking device 12, such as, for example, the input unit 22, sensory output unit 36 and motion sensor 34.

As further shown in FIG. 5, sensory networking device 12 includes sensory output unit 36. Sensory output unit 36 is the element of sensory networking device 36 that emits a sensory effect. In one example, sensory output unit 36 is a LED module. The LED module can emit one or more colors of light. The LED module can be adjacent or connected to a connection point on housing 10 such the flexible light fiber is secured adjacent the LED module so that the light emitted by the LED module is transmitted through the flexible light fiber. As can be appreciated, in one example, the LED module emits a light that is transmitted through a flexible light fiber so as to produce a light-emitting shoelace. In a preferred embodiment, sensory networking device 12 includes one or more bi-color LEDs. In such an embodiment, the LED module can be changed from a first state in which the LED module emits a first color (e.g., red) to a second state in which the LED module emits a second color (e.g., green). In other example sensory networking devices, sensory output unit 36 may be capable of emitting a different sensory effect. For example, sensory output unit 36 may be a speaker or vibrating component that can emit one or more auditory or tactile effects.

Sensory networking device 12, in one example, includes motion sensor 34. Motion sensor 34 is the element of sensory networking device 12 that detects motion and can produce movement data in response to detecting a motion. Various example motion sensors 34 may include accelerometers and gyro sensors. In one preferred embodiment, sensory networking device 12 is an accelerometer that can detect accelerations in the X, Y and Z directions such as model no. ADXL362BCCZ-RL7 manufactured by Analog Devices Inc. Other suitable motion sensors can also be used.

In other embodiments of sensory networking device 12, other sensors could be provided in addition to or as a substitute to motion sensor 34. For example, various biofeedback sensors could be included in or connected to sensory networking device 12. Data regarding brainwaves, muscle tone, skin conductance or heart rate, for example, could be collected via such sensors and sent to processor 30. The biofeedback data could be used in addition to or in place of trigger movement data to initiate, enhance or change a trigger signal that is transmitted to neighboring sensory networking devices. In one example, a detected increase in heart rate of a wearer of a sensory networking device 12 in addition to a trigger movement could increase the intensity of the color change in the wearer's sensory networking device and, in turn, increase the intensity of the color change in neighboring sensory networking device that receives a trigger signal and implements a corresponding sensory effect.

As further depicted on FIG. 5, an energy harvester 38 may be connected to sensory networking device 12. In such an example, the motion of a wearer of sensory networking device 12 can be harvested to provide energy to power sensory networking device 12 or charge a battery. In the light-emitting shoelace device example, energy harvester 38 could be included in a shoe 16 of the wearer. The gait or the stepping motion of the wearer could be converted into electrical energy to power sensory networking device 12. In one example, energy harvester 38 is implemented as described in the publication, *Energy harvesting from human motion: exploiting swing and shock excitations*, Ylli, K. et al., *Smart Mater*, Vol. 24, p. 1, 2015, the content of which in its entirety is incorporated herein by reference.

The foregoing elements of sensory networking device 12 enable the device to be used to implement a sensory effect, detect a trigger movement and transmit a trigger signal to other neighboring sensory networking devices. Still further, sensory networking device 12 is able to receive a trigger signal from another sensory networking device and implement a sensory effect on the sensory networking device as indicated by the trigger signal in concert with other neighboring sensory networking devices. As will be explained, this enables sensory networking device to communicate with other sensory networking devices and produce coordinated sensory effects in crowds or among groups of individuals that are wearing or using the sensory networking devices. In one example, light-emitting shoelaces are able to communicate with one another and produce coordinated light or visual effects.

Figure 6:
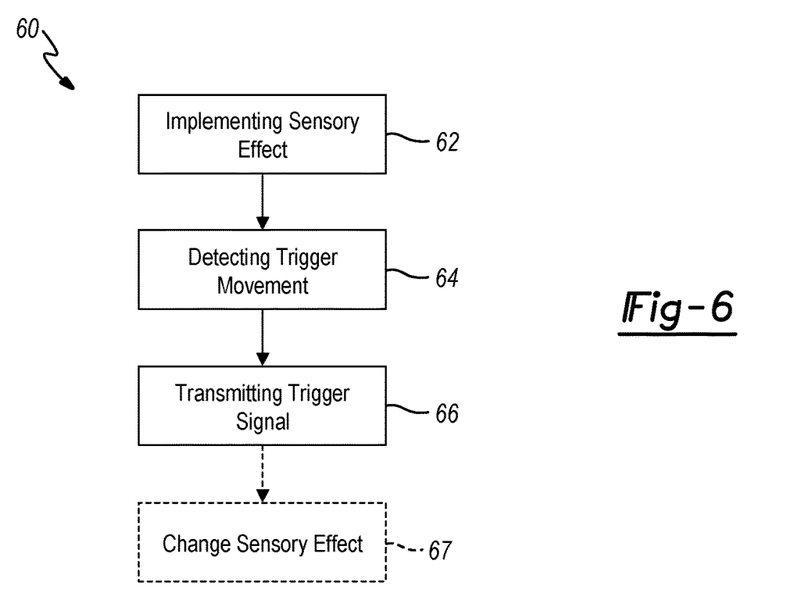
FIG. 6 is a process flow diagram of an example method of the present disclosure.

As previously described, sensory networking device 12 includes memory 26 on which control application 28 may be stored. Control application 28 includes the instructions by which the previously described coordinated sensory effects can be initiated and coordinated among neighboring sensory networking devices. FIG. 6 illustrates one example method or process that can be implemented by processor 30 through one or more instruction modules of control application 28. The example method 60 of propagating a sensory effect begins at step 62 in which a sensory effect is implemented on the sensory networking device. In one preferred embodiment, sensory networking device 12 is a light-emitting shoelace device 18. In such an embodiment, the step 62 of implementing a sensory effect includes the pressing of a button on housing 10. This action through input unit 22 initiates a command that can turn on the light-emitting shoelace or, alternatively, change the color of light of the light-emitting shoelace. Either turning on or changing the color of light are two examples of the implementation of a sensory effect.

Figure 7:
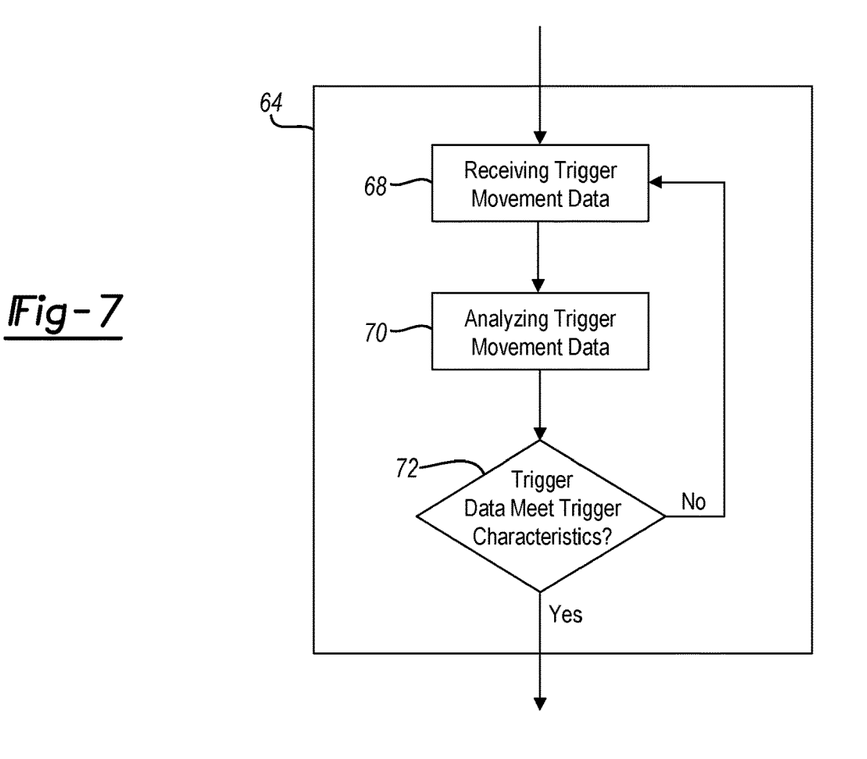
FIG. 7 is a process flow diagram of an example subprocess of the example method of FIG. 6.

Between step 62 and step 64, sensory networking device is idle and is emitting the implemented sensory effect (e.g., displaying light via flexible light fiber 14). At step 64, sensory networking device 12 detects a trigger movement. A trigger movement is a movement of sensory networking device 12 that results in the transmission of a trigger signal. The process for detecting a trigger movement is shown in FIG. 7. Sensory networking device 12 is detecting movement through motion sensor 34. As movement is detected, trigger movement data is collected and provided to the processor 30. Processor 30 then compares the trigger movement data against trigger characteristics. If the trigger movement data meets pre-determined trigger characteristics, then the process moves forward to step 66. If the trigger movement data does not meet the trigger characteristics, then sensory networking device 12 remains idle and continues monitoring and collecting trigger movement data in response to further movements until such data indicates that the trigger characteristics have been met. For example, in the light-emitting shoelace device embodiment, a wearer of the device can walk or stomp his foot on which the light-emitting shoelace device is being worn. In response to such movement, trigger movement data is received from the motion sensor 34 by the processor at step 68. This trigger movement data is analyzed by processor 30 at step 70 and compared against the pre-determined trigger characteristics. In this example, the trigger characteristics could be a threshold acceleration in the z-direction in the attempt to detect a stomp of the wearer's foot on which the light-emitting shoelace device 20 is being worn. If the trigger movement data collected by the motion sensor 34 and received and analyzed by processor 30 indicates that the z-direction acceleration threshold is met, then the process moves to step 66 of transmitting the trigger signal. If the analysis by the processor at steps 70, 72 indicates that the z-direction acceleration threshold is not met, it is likely that the wearer is only walking and is not stomping as required to initiate the transmission of a trigger signal.

In other examples, other movements can be detected by motion sensor 34 and analyzed against the trigger characteristics in order to determine whether a trigger movement has occurred. Such analysis could be used to determine whether other movements have occurred such as jumping, hand clapping, gestures, dance movements and others. These movements, in turn, could be used as trigger movements. In other examples of sensory networking device 12, other components could be added or additional functionality could be added to provide artificial intelligence or self-learning. Such additional functionality could enable sensory networking device to collect data, identify patterns and learn the preferences and movements of an individual user in order to better analyze trigger movement data and identify when a trigger movement has occurred.

If a trigger movement is detected at step 64 (i.e., the trigger movement data meets the trigger characteristics) then sensory networking device 12 implements step 66 of transmitting a trigger signal. The control application 28 instructs the processor to transmit a trigger signal via transceiver 24. In one embodiment the trigger signal is transmitted via a Bluetooth signal. The trigger signal that is transmitted at step 66 may include one or more pieces of data that have different uses when received by a neighboring sensory networking device. In one example trigger signal, the trigger signal may include sensory effect data, sensory networking device identification data and synchronizing data. Sensory effect data includes information that causes a neighboring sensory networking device to implement the same sensory effect that was implemented on the initiating sensory networking device at step 62 as previously described. In the light-emitting shoelace device example, the neighboring light-emitting shoelace device that receives the sensory effect data in the trigger signal changes its LED light to the same color as was displayed by the initiating sensory networking device. In this manner, the sensory effect emitted by the initiating sensory networking device 12 can be propagated to other neighboring sensory networking devices.

The trigger signal may also include sensory networking device identification data. The sensory networking device identification data can include information that identifies the initiating sensory networking device and/or provides a unique identification number to the trigger signal. Neighboring sensory networking devices that receive the trigger signal with the sensory networking device identification data can, with this information, determine and differentiate between new trigger signals and previously implemented trigger signals. With this information, the receiving sensory networking devices can only implement the new trigger signals and ignore trigger signals that it already received.

The trigger signal may also include synchronizing data. Synchronizing data can include information that assists with the coordination of the implementation of sensory effects in neighboring sensory networking devices. For example, a trigger signal may include delay information so that instead of implementing a sensory effect immediately upon receipt of a trigger signal, the neighboring sensory networking device that receives the trigger signal waits a predetermined amount of time before implementing the sensory effect. Alternatively, the trigger signal could include information designating a scheduled time at which the sensory effect is to be implemented. This way, if multiple neighboring sensory networking devices receive the trigger signal at different times, the neighboring sensory networking devices will not implement the sensory effect until the predetermined delay expires or the scheduled implementation time occurs. In this manner, all the neighboring sensory networking devices will implement the sensory effect substantially at the same time or at least appear to do so by observers.

Referring back to FIG. 6, the trigger signal is transmitted at step 66. This step may include the repeated transmission of the trigger signal. For example, upon being instructed to transmit the trigger signal, sensory networking device 12 may transmit the trigger signal five times separated by predetermined delays. The synchronizing data in the trigger signal can also be incremented such that each transmission of the trigger signal includes a variation (i.e., decreases the wait time) so that if a neighboring sensory networking device receives a second, third, fourth or fifth transmission of the trigger signal the simultaneous implementation of the sensory effect is maintained.

Example method 60 may also optionally include step 67. At step 67, the sensory effect of the sensory networking device 12 can be changed. This change may a return to an original state if the sensory effect was altered at step 62 or sensory networking device 12 may change its sensory effect in response to the detection of a trigger movement at step 64. The change of the sensory effect may occur before or after the transmission of the trigger signal at step 66. In the light-emitting shoelace device example, a user may stomp his foot on which the light-emitting shoelace device is being worn and the device detects the stomp as trigger movement at step 64 and transmits a trigger signal at step 66. The light-emitting shoelace device may also change the color of the user's own device in response to detecting the stomp at step 67.

Figure 9:
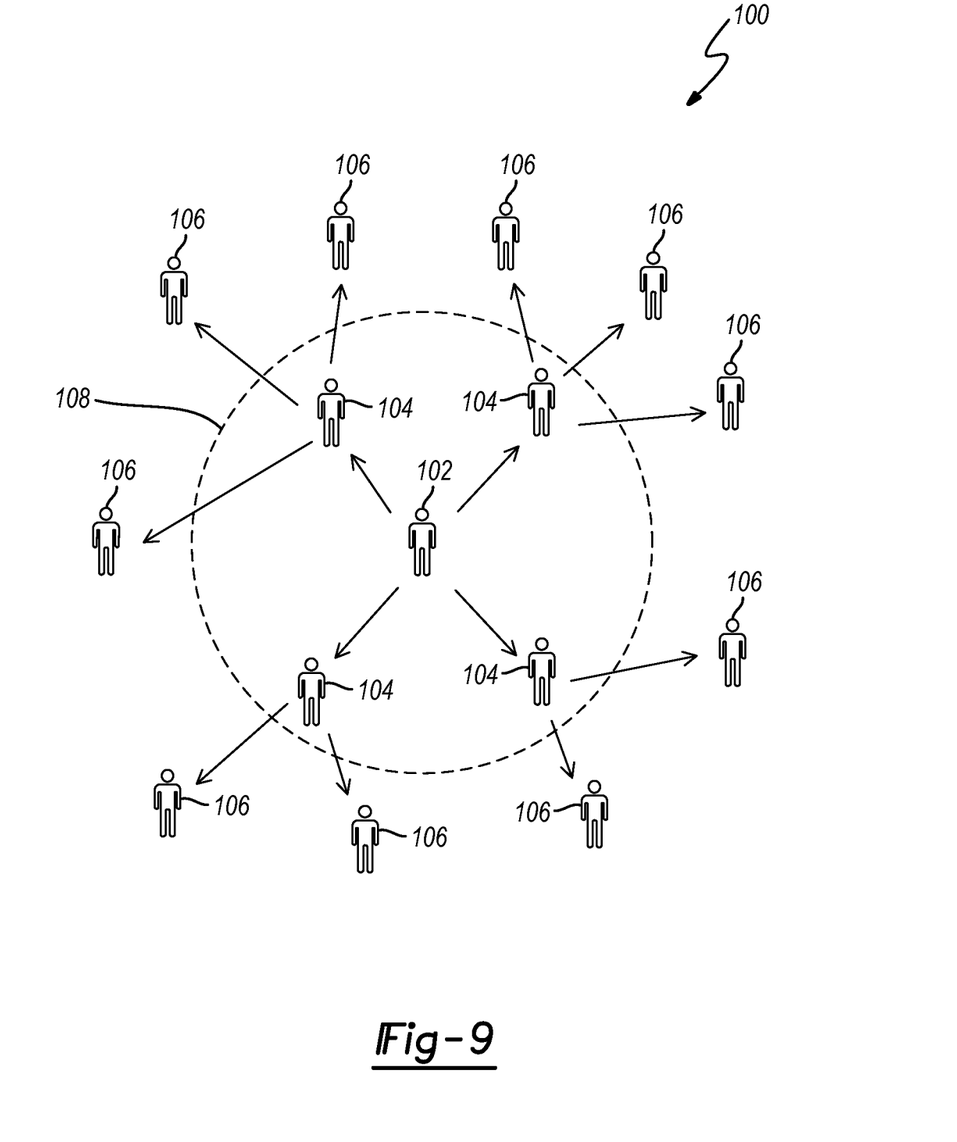
FIG. 9 is an illustration of an example sensory network of the present disclosure.

The present disclosure further contemplates that the propagation of the sensory effect can extend beyond the first transmission of the trigger signal and thus beyond the range of the initiating sensory networking device. Such capability of the sensory network of the present disclosure is illustrated in FIG. 9. In sensory network 100, two or more sensory networking devices exist. In this example, an initiating sensory networking device or initiating node 102 may follow the process of FIG. 6 and transmit a trigger signal. The distance that the trigger signal may travel is limited by the range 108 of the transceiver of the initiating node 102. Thus, only neighboring nodes (or neighboring sensory networking devices) 104 receive the trigger signal from originating node 102. The network 100 is extended, however, if the neighboring nodes 104 re-transmit the trigger signal after receiving the trigger signal. In this manner, secondary neighboring nodes 106 are able to receive the trigger signal even though they are located beyond the range 108 of the initiating node 102. This process of re-transmission can continue even further and effectively extend the size of sensory network 100 so long as neighboring nodes continue to be located within range of a re-transmitting node.

Figure 8:
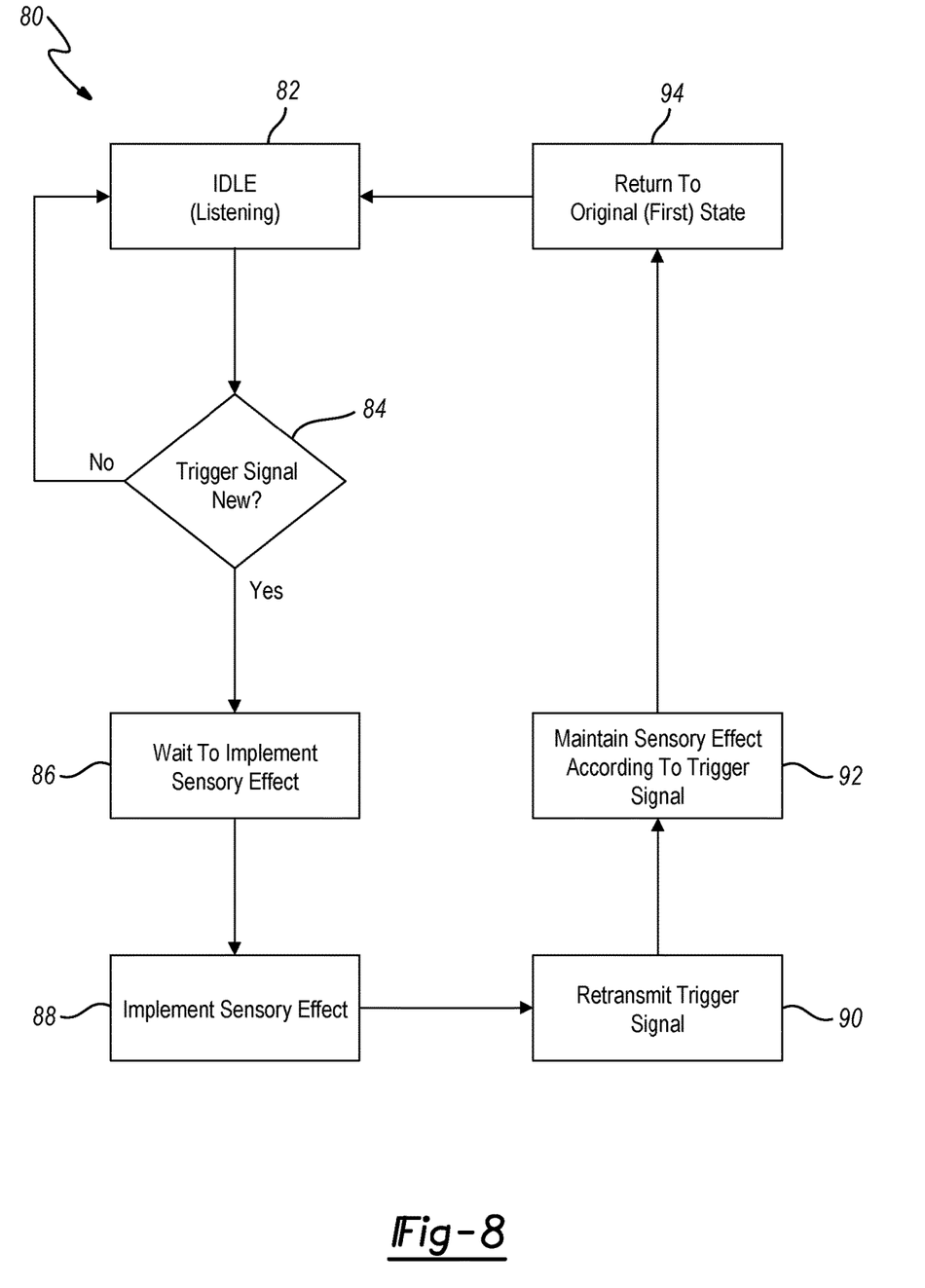
FIG. 8 is a process flow diagram of another example method of present disclosure.

This re-transmission of trigger signals enables the sensory network of the present disclosure to create extensive communication and sensory networks without the need for an underlying communication network such a cellular or local-area network. This process of retransmission of a trigger signal is illustrated in FIG. 8. The process begins, in one example, with a sensory networking device in the idle state at step 82. In this state, the sensory networking device is "listening" for trigger signals from neighboring sensory networking devices. Upon receiving a trigger signal, the receiving sensory networking devices determines whether the trigger signal is a new trigger signal or a trigger signal previously received. The sensory networking device identification data that may be included in a trigger signal (as previously described) is used to determine whether the trigger signal is new at step 84. If the trigger signal was previously received, the receiving sensory networking device does nothing and returns to the idle state. If the trigger signal is a new trigger signal, the receiving sensory networking devices moves to step 86.

At step 86, the receiving sensory networking device waits to implement the sensory effect. As previously described, the trigger signal may include synchronizing data that includes information to enable a coordinated sensory effect across multiple receiving sensory networking devices. The receiving sensory network device waits to implement the sensory effect according to this information in the trigger signal. The receiving sensory networking device then implements the sensory effect at step 88. This step may include, for example in the light-emitting shoelace device embodiment, the change of the color of light emitted by the device.

The aforementioned re-transmission of the trigger signal occurs at step 90. After implementing the sensory effect, the receiving sensory networking device re-transmits the trigger signal. This step may effectively extend the sensory network 100 beyond the range 108 of the initiating sensory networking device 102. As described with respect to the initiating sensory networking device, the receiving sensory networking device may re-transmit the trigger signal multiple times. In one example, the receiving sensory networking device re-transmits the trigger signal five times.

At step 92, the receiving sensory networking device maintains the sensory effect according to the information provided in the trigger signal. Just as the trigger signal may include information to assist in the synchronization of the implementation of the sensory effect, so too may the trigger signal include information to synchronize the stoppage of the sensory effect. At step 94, the receiving sensory networking device returns to its original state (i.e., the state it was in before the implementation of the sensory effect). The receiving sensory networking device then returns to the idle state in which it continues to listen for new trigger signals.

As can be appreciated, the previously described process can continue to be executed by receiving sensory networking devices to propagate a trigger signal across a sensory network. So long as receiving sensory networking devices continue to receive new trigger signals and re-transmit them, the trigger signal continues to be implemented across a sensory network.

Example implementations and uses of the foregoing devices and related methods will now be described to further describe embodiments of the present disclosure. The first described use contemplates the light-emitting shoelace device embodiment. The uses could be extended to other physical embodiments of the sensory networking device such as to decorative lighting, toys, ground lighting, signage and others. In one example use, a group of individuals all are wearing light-emitting shoelace devices as previously described. A first user changes his light-emitting shoelace device from red to green by depressing a button on the device. The same first user stomps the user's foot on which the light-emitting shoelace device is being worn. This stomp is analyzed by the light emitting shoelace device to be a trigger movement and in response transmits a trigger signal to neighboring users that are wearing a light-emitting shoelace. The neighboring users that are located within range of the first user's light-emitting shoelace device receive the trigger signal and, in turn, the neighboring users' light-emitting shoelace devices also change their colors to green and then re-transmit the trigger signal to secondary neighboring users' light emitting shoelace devices that then change their colors to green and re-transmit. The result is a wave of change of color of the group of users' light-emitting shoelace devices from red to green that occurs as the trigger signal is propagated from user to user in the network.

In another example use, two different users stomp their feet with the light-emitting shoelaces but one user is displaying a red light and the other is displaying a green light. Each light-emitting shoelace device transmits a trigger signal to neighboring users' light-emitting shoelace devices. As the trigger signals propagate, the triggered light-emitting shoelaces begin to overlap. Where there is overlap, the combination of red and green produces a yellow light in the overlapped triggered light-emitting shoelace devices. This cascade of the transmission of the two different trigger signals creates a unique visual effect as the two waves of color move toward each other and overlap in a crowd of users.

In still another example use, interaction among several users is incorporated into the implemented sensory effect. In one such use, two or more users wearing light-emitting shoelace devices both stomp to initiate trigger signals at the same time (or within a predetermined span of time). Such corresponding trigger movements and subsequently transmitted trigger signals create an additive effect that can increase the intensity of the sensory effect (e.g., display a brighter color) or increase the distance that the trigger signal travels by permitting the trigger signal to travel to more neighboring light-emitting shoelace devices. Other additive or interactive effects can also be created.

In other example uses, the sensory networking device can be coupled to external devices such as smart phones through which users are able to enter personal information, likes or other characteristics, such as, for example, a zodiac sign. This information can be included in a trigger signal that is transmitted such that the sensory effect (e.g., color change on a light-emitting shoelace device) is only implemented on neighboring light-emitting shoelace devices worn by users having the same or similar personal information or other characteristics. In such an example, only the light-emitting shoelace devices of other neighboring users with the same zodiac sign as a trigger signal initiator will change color in response to a stomp by the trigger signal initiator.

Still other uses and implementations of the sensory networking devices are possible using the structure and functionality of the present disclosure. Such other uses can include connected play, dance, physical education, crowd control or rehabilitation. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:

implementing, by a processor, a sensory effect on a sensory networking device;

detecting, by a motion sensor in the sensory networking device, a trigger movement of the sensory networking device;

in response to detecting the trigger movement, transmitting, by a transceiver in the sensory networking device, a trigger signal to one or more neighboring sensory networking devices via a wireless communication link, the trigger signal configured to cause the sensory effect to be implemented on the one or more neighboring sensory networking devices and further configured to cause the trigger signal to be re-transmitted by the one or more neighboring sensory networking devices.

2. The method of claim 1 wherein the sensory networking device is in the form of an elongated flexible light fiber.

3. The method of claim 1 wherein the sensory effect is a display of light.

4. The method of claim 1 wherein the step of detecting a trigger movement further comprises:

receiving, by the processor in the sensory networking device, trigger movement data from a motion sensor of the sensory networking device; and analyzing, by the processor in the sensory networking device, the trigger movement data by comparing the trigger movement data to one or more predetermined trigger movement characteristics.

5. The method of claim 1 wherein the trigger signal includes sensory effect data that includes information regarding characteristics of the sensory effect, sensory networking device identification data that includes information that identifies the sensory networking device and synchronizing data that includes information regarding when the one or more neighboring sensory networking devices should implement the sensory effect.

6. The method of claim 1 wherein the trigger movement is the stomp of a foot on which the sensory networking device is attached.

7. The method of claim 1 wherein the step of transmitting the trigger signal is repeated two or more times or until the sensory effect is implemented on the one or more neighboring sensory networking devices.

8. A sensory networking device comprising:

a processor;

a sensory output unit connected to the processor and configured to emit a sensory effect;

a motion sensor connected to the processor and configured to detect movement and generate trigger movement data in response thereto;

a transceiver connected to the processor and configured to transmit a trigger signal; and non-transitory memory connected to the processor, the non-transitory memory having instructions stored thereon that when executed by the processor cause the processor to:

receive the trigger movement data;

analyze the trigger movement data; and transmit the trigger signal to one or more neighboring sensory networking devices when the trigger movement data meets one or more predetermined trigger characteristics;

wherein the trigger signal is configured to cause the sensory effect to be implemented on the one or more neighboring sensory networking devices and further configured to cause the trigger signal to be re-transmitted by the one or more neighboring sensory networking devices.

9. The sensory networking device of claim 8 wherein the sensory output unit is connected to an elongated flexible light fiber.

10. The sensory networking device of claim 8 wherein the sensory effect is a display of light.

11. The sensory networking device of claim 8 wherein the motion sensor is an accelerometer.

12. The sensory networking device of claim 8 wherein the trigger signal includes sensory effect data that includes information regarding characteristics of the sensory effect, sensory networking device identification data that includes information that identifies the sensory networking device and synchronizing data that includes information regarding when the one or more neighboring sensory networking devices should implement the sensory effect.

13. The sensory networking device of claim 8 wherein the re-transmission of the trigger signal by the one or more neighboring sensory networking devices allows the trigger signal to be received by one or more neighboring sensory networking devices located at a distance greater than a range of the transceiver located in the sensory networking device.

14. The sensory networking device of claim 8 wherein the trigger movement is a stomp of a foot on which the sensory networking device is attached.

15. The sensory networking device of claim 8 wherein the instructions stored on the non-transitory memory further cause the transmission of the trigger signal to be repeated two or more times or until the sensory effect is implemented on the one or more neighboring sensory networking devices.

16. A light-emitting shoelace device comprising:

a processor;

an elongated flexible light fiber connected to an LED module configured to emit one color of light corresponding to a first state and a different color of light in a second state;

a motion sensor connected to the processor and configured to detect movement and generate trigger movement data in response thereto;

a transceiver connected to the processor and configured to transmit a trigger signal; and non-transitory memory connected to the processor, the non-transitory memory having instructions stored thereon that when executed by the processor cause the processor to:

receive the trigger movement data;

analyze the trigger movement data; and transmit the trigger signal to one or more neighboring light-emitting shoelace devices when the trigger movement data meets one or more predetermined trigger characteristics;

wherein the trigger signal is configured to cause the LED module of the one or more neighboring light-emitting shoelace devices to change from the first state to the second state and further configured to cause the trigger signal to be re-transmitted by the one or more light-emitting shoelace devices.

17. The light-emitting shoelace device of claim 16 wherein the motion sensor is an accelerometer.

18. The light-emitting shoelace device of claim 16 wherein the trigger signal includes sensory effect data that includes information regarding characteristics of the sensory effect, sensory networking device identification data that includes information that identifies the sensory networking device and synchronizing data that includes information regarding when the one or more neighboring sensory networking devices should implement the sensory effect.

19. The light-emitting shoelace device of claim 16 wherein the re-transmission of the trigger signal by the one or more neighboring light-emitting shoelace devices allows the trigger signal to be received by neighboring light-emitting shoelace devices located at a distance greater than a range of the transceiver located in the light-emitting shoelace device.

20. The light-emitting shoelace device of claim 16 wherein the trigger movement is a stomp of a shoe on which the light-emitting shoelace device is attached.

\* \* \* \* \*